Aug. 19, 1924.
A. K. HUNTLEY
ELECTRIC BATTERY
Filed Feb. 12, 1920
1,505,644
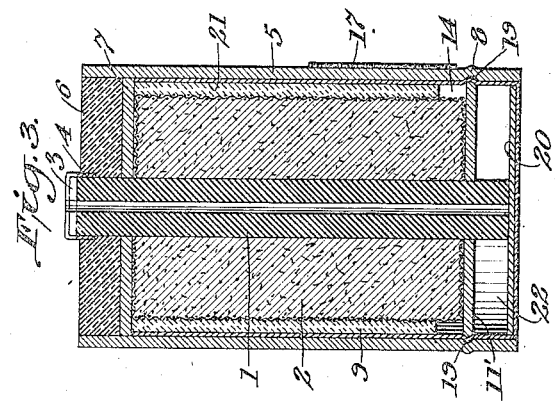
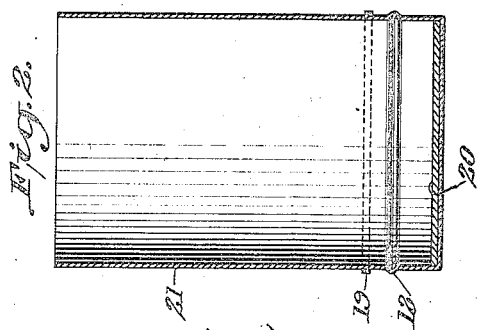
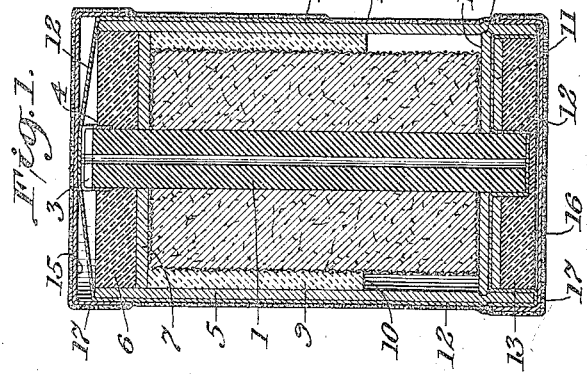

Patented Aug. 19, 1924.

1,505,644

UNITED STATES PATENT OFFICE.

ALTON KARL HUNTLEY, OF CLYDE, OHIO, ASSIGNOR TO NATIONAL CARBON COMPANY, INC., A CORPORATION OF NEW YORK.

ELECTRIC BATTERY.

Application filed February 12, 1920. Serial No. 358,205.

*To all whom it may concern:*

Be it known that I, ALTON KARL HUNTLEY, a citizen of United States, residing at Clyde, in the county of Sandusky and State of Ohio, have invented certain new and useful Improvements in Electric Batteries, of which the following is a specification.

This invention relates to an improvement in dry cells and particularly to the type of cells which are only capable of producing electric current after a suitable operation is performed for this purpose. In cells of this kind the principal requisites are simplicity of manipulation and construction, and capability when rendered active, even after having been stored for long periods in the inactive condition, of producing immediately a current of amperage and voltage approximately equal to that of similar size dry cells made up with all of the reactive materials in operative relation.

The object of my invention, generally speaking, is to secure a cell of the characteristics mentioned and the invention resides in the features of construction hereinafter described by way of example with reference to a cell embodying the improvements.

One of the particular objects of the invention is to provide a simple means for preventing evaporation of moisture or leakage before the cell is put in service and also after the cell is in service.

Other objects will be referred to in the following description, reference being had to the drawings in which:—

Figure 1 is a central vertical section of a cell with the zinc element absent;

Fig. 2 is a similar section of the zinc element; and

Fig. 3 is a central vertical section of the cell in active condition.

Referring to the drawings, reference character 1 indicates a longitudinally perforated carbon electrode which is surrounded by a molded depolarizing mix 2 of carbon and manganese dioxide moistened with electrolyte solution. Both ends of the electrode project from the mix, and the upper end preferably has slots 3 cut therein for a purpose to be referred to hereafter. The usual brass cap 4 is preferably fitted on the upper end, in which case the cap has a perforation corresponding to that of the carbon, and the slotting will be applied to its surface and may extend into the carbon.

The electrode and mix, which is usually referred to as a bobbin, is supported in a waterproof non-conducting casing or retainer 5 by means of a seal 6 and a non-conducting disk 7. Metallic or non-metallic materials may be utilized for the casing, but if corrodible metal is used the inside of the casing will be coated with waterproofing material. Various non-metallic casings are desirable, such as paraffined cardboard, fiber, hard rubber, etc., but I have found celluloid or similar materials to be particularly suitable because of their non-corrosive character and transparency. Near the lower end the casing is beaded as indicated at 8, for a purpose to be referred to hereafter.

The upper portion of the space between the mix and casing contains paste 9 which extends to about the distance indicated by the line 10. The paste consists of the usual combination of flour, starch or other material with electrolyte solution and a preservative such as mercuric chloride which after gelatinizing assumes a consistency corresponding substantially to that of ordinary library paste.

Non-conducting disks 11 and 11' are fitted over the carbon electrode adjacent the lower end of the mix, the outer edge of disk 11' being adapted to fit in the groove 8. To facilitate subsequent removal of the disk 11, a narrow strip of cloth or tape 12 is attached to the disk or fitted between the bobbin and disk 11 over the opening in the carbon electrode, as shown. A seal 13 is then arranged in the space between the carbon electrode and casing to prevent drying out of the mix and paste. A filling of paraffine, or a cork, is suitable for this purpose.

For long periods of storage it has also been found advantageous to further protect the article from evaporation by fitting removable end caps 15 and 16 on the retainer. To facilitate the removal of the end caps the free end of the strip 12 is wrapped partially around the casing to extend over the ends, as shown in the drawing. After the caps and strip are in position the entire assembly is dipped in paraffine or other waterproofing material, the coating of paraffine thus applied being referred to by reference character 17. In this manner evaporation of moisture is almost entirely eliminated, and a neat, durable package is secured.

The article described is utilized in conjunction with a zinc can 21 which is adapted to serve as the electrode when inserted in the casing 5 in the manner which will be hereafter described. The zinc can, which has an outer diameter approximately equal to the inner diameter of the casing, is provided with a flange or bead 18 which cooperates with the bead 8 to retain the can. A rubber band 19 is placed around the can just above the bead 18. A disk of pulpboard 20 is fitted in the bottom of the can for a purpose to be referred to hereafter.

When it is desired to place the cell in action the user loosens the free end of the tape from the paraffine coating and unwinds it from the casing to remove caps 15 and 16, disk 11 and seal 13. The assembly is then in condition to receive the zinc can 21 which is pushed into the casing to activate the cell. The disk 11' yields sufficiently to permit the can to pass into the paste and the air trapped in the can escapes through the hollow carbon electrode. If the user inadvertently places a finger over the opening in the upper end, air may still escape through the slots 3 in the cap and electrode.

As the can is forced into the casing, substantially all of the paste will pass into the former. The can is longitudinally moved in the casing until beads 8 and 18 interlock, the rubber band 19 slipping between the beads to provide an air-tight seal. By suitable selection of the dimensions of the can, casing, carbon electrode and mix bobbin, the pulpboard disk in the lower end of the can is adapted to contact with the carbon electrode when the can is in its locked position. The paste substantially fills the space between the zinc can and the mix, leaving a small air space 14 surrounding the lower end of the mix and a second air space 22 between the disk 11' and disk 20, surrounding the projecting end of the carbon electrode.

The space which previously contained the paraffine seal and disk 11 serves as an air space 22 to receive paste or electrolyte. The expansion of the paste first fills the space 14 and on heavy service moves the retaining disk 11' in the chamber. The air or gases collecting in the air space escape through the hollow carbon electrode due to the imperfect contact necessarily existing between the latter and the disk 20. The contact is, however, sufficiently tight to prevent the escape of paste if any escapes past the disk 11'.

A number of these cells may be connected in series, with the carbon electrode or terminal cap of one cell in contact with the bottom of an adjacent cell. A number of the cells may then be utilized in a hand lamp in which pressure is applied to the ends of the series of cells. By having the carbon electrode in contact with the pulpboard in the bottom of the zinc can, a column is provided in the center of the cell to withstand the pressure. This also serves as a convenient temporary venting means which permits the zinc can to be readily inserted. The lower end of the carbon is closed tightly enough, when the cell is activated, to prevent leakage of paste, but does not prevent escape of gases.

By means of the locking arrangement on the can, loss of moisture is prevented when the cell is in service, and the can is held tightly in position so that it cannot be forced out by gases developed in the cell, especially as their slow escape is permitted by the hollow carbon.

Having described my invention, what I claim is:—

1. A dry cell of the kind described, comprising a depolarizing mix, a casing surrounding the depolarizing mix having an end projecting beyond the corresponding end of the mix, a filling of paste adjacent the mix, a removable closure comprising a filling in said end of the casing for use before the cell is energized, a zinc electrode adapted to be inserted in the paste to energize the cell, and a closure for said end of the casing and spaced from the bottom of the mix.

2. An article of manufacture of the kind described, comprising a depolarizing mix, a casing surrounding the depolarizing mix having an end projecting beyond the corresponding end of the mix, a filling of paste adjacent the mix, and a removable closure comprising a filling in said end of the casing for use before the cell is energized.

3. An electric battery of the kind described, comprising a casing and a closely interfitting hollow zinc electrode, said zinc electrode and casing being capable of longitudinal adjustment to render the cell active, and having cooperating flanges adapted to properly position the zinc electrode and casing and to prevent relative displacement.

4. An electric battery of the kind described, comprising a casing and an adjacent hollow zinc electrode, said zinc electrode and casing being capable of longitudinal adjustment to render the cell active and having cooperating flanges adapted to properly position the zinc electrode and casing and to prevent relative displacement, and sealing means between the flanges.

5. An electric battery of the kind described, consisting of a casing, a depolarizing mix therein spaced therefrom, a closure in one end of the casing for supporting the mix therein, a filling of paste adjacent the mix, a zinc can insertable in the casing in contact with the paste, said can and casing having cooperating flanges adapted to retain the can in position in the casing.

6. An electric battery of the kind described, comprising a casing, a depolarizing mix therein, a filling of paste adjacent the mix, a zinc container electrode in the other end of the casing, said electrode and casing having cooperating flanges adapted to retain the can in position, and sealing means between the flanges.

7. An article of manufacture of the kind described, comprising a casing, a carbon electrode, a mix surrounding the carbon electrode, spacing means adjacent one end of the electrode to center said electrode in the casing, and a removable closure between the casing and said spacing means.

8. An article of manufacture of the kind described, comprising a waterproof casing, a carbon electrode, a mix surrounding the carbon electrode, one end of the electrode projecting from the mix, and a removable closure between the casing and the projecting end of the electrode, and means cooperating with the closure adapted to be grasped to withdraw the latter.

9. An article of manufacture of the kind described, comprising a casing, a carbon electrode, a mix surrounding the carbon electrode, spacing means adjacent one end of the electrode to center said electrode in the casing, a removable closure between the casing and said spacing means, and means cooperating with the closure adapted to be grasped to withdraw the latter.

10. An article of manufacture of the kind described, comprising a casing, a carbon electrode, a mix surrounding the carbon electrode, one end of the electrode projecting from the mix, a removable closure between the casing and said projecting end of the electrode, and a strip located between the mix bobbin and closure adapted to be grasped to withdraw said closure.

11. An electric battery of the kind described, comprising a casing, a carbon electrode, a mix surrounding the carbon electrode, said electrode having its ends projecting from the mix, a seal for spacing the mix from the casing, a filling of paste between the mix and casing, a removable closure between the casing and the lower projecting end of the electrode, a hollow zinc container electrode adapted to be inserted in the casing upon the removal of the last mentioned seal, and cooperating locking means on the casing and zinc can adapted to retain the can in the active position in the casing.

12. An electric battery of the kind described, comprising a hollow zinc electrode and a casing capable of longitudinal adjustment to render the cell active, a longitudinally perforated carbon electrode adapted to serve as an air vent during said adjustment, said carbon electrode having means adapted to prevent inadvertent closing of the end of the perforated carbon electrode.

13. An electric battery of the kind described, comprising a casing, a longitudinally perforated carbon electrode having an exposed terminal end, a mix surrounding the carbon electrode, the terminal end of the electrode projecting from the mix, a zinc container electrode adapted to be inserted in the casing to render the cell active, said projecting end of the carbon electrode having its terminal end slotted to prevent inadvertent closing of the exposed perforation when the zinc is inserted.

14. An electric battery of the kind described, consisting of a non-conducting waterproof casing, a longitudinally perforated carbon electrode, a mix surrounding the carbon electrode and spaced from the casing, the ends of the electrode projecting from the mix, a filling of paste between the mix and casing, a zinc can adapted to be inserted in the paste with its lower end adjacent the lower projecting end of the carbon electrode to provide an air space in the lower end of the casing, said carbon electrode having means adapted to prevent inadvertent closing of the opening in the upper end of the perforated carbon electrode when the can is being forced into the casing.

15. An article of manufacture of the kind described, consisting of a casing, a depolarizing mix therein, sealing means in one end of the casing for supporting the mix therein, a removable seal for closing the other end of the casing, a removable air-tight cap over each end, and means for removing said caps and seal.

16. An article of manufacture of the kind described, consisting of a waterproof casing, a carbon electrode and mix surrounding the carbon electrode, said electrode having one end projecting from the mix, a seal in one end for spacing the mix from the casing, said end having a vent therein, a removable cap on said end of the casing, a second removable cap on the other end of the casing, a strip between the casing and caps for removing said caps, a coating of waterproofing material over said caps.

17. An article of manufacture of the kind described, consisting of a casing, a depolarizing mix therein, a closure in one end of the casing for supporting the mix, a removable closure for the other end of the casing, a cap on each end of the casing and means adapted to successively remove the caps and removable closure.

18. An article of manufacture of the kind described, consisting of a depolarizing mix therein, a closure in one end of the casing for supporting the mix therein, a removable closure for the other end of the casing, a cap for each end of the casing and a strip connected to the removable closure and extending between the caps and casing to facilitate removal of the caps and removable closure.

19. An article of manufacture of the kind described, consisting of a depolarizing mix therein, a closure in one end of the casing for supporting the mix, a removable closure for the other end of the casing, a cap for each end of the casing, a strip connected to the removable closure and extending between the caps and casing to facilitate removal of the caps and removable closure, and a coating of waterproof material over the caps and casing.

In testimony whereof, I affix my signature.

ALTON KARL HUNTLEY.